Patented Sept. 6, 1949

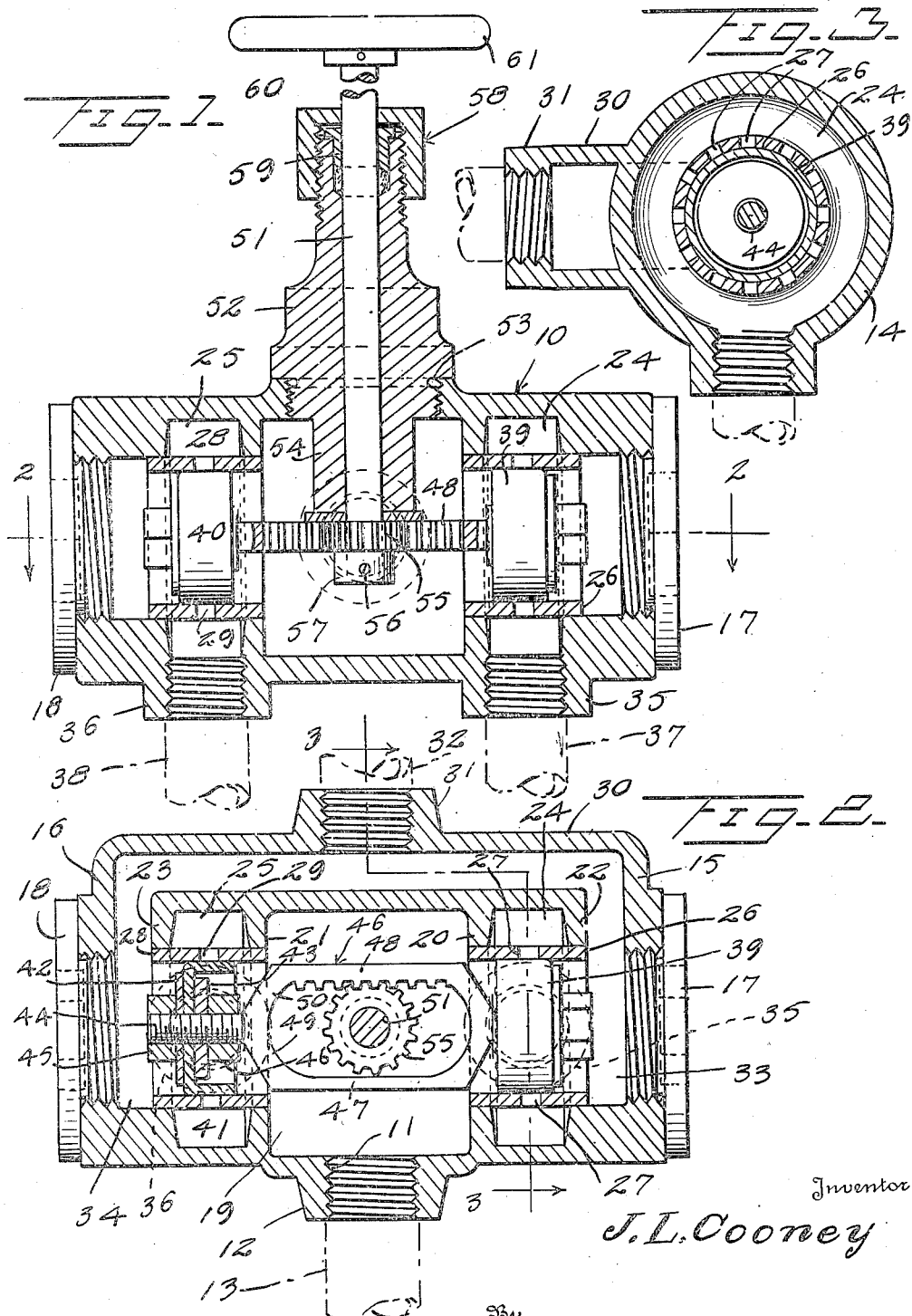

2,481,293

UNITED STATES PATENT OFFICE 2,481,293

VALVE

John L. Cooney, Erie, Pa.

Application July 6, 1945, Serial No. 603,528

1 Claim. (Cl. 277—12)

This invention relates to valves.

An object of this invention is to provide a multi-port valve embodying a housing having a sliding double ended valve plug which in one position thereof is to regulate the flow of fluid from a central chamber to an outlet port, and at the same time the valve plug is adapted to regulate the return flow of the fluid so that the oppositely moving fluids will substantially balance or equalize the pressures on the valve plug.

Another object of this invention is to provide a valve structure having an inlet port, an outlet port, and a return port, and including means whereby the flow of fluid can be reversed.

A further object of this invention is to provide a valve structure of this kind which is of simple construction wherein the valve plug will not creep due to the substantially equalized pressures on the opposite ends of the plug.

With the foregoing objects in view, and others which may hereinafter more fully appear, the invention consists of the novel construction, combination and arrangement of parts, as will be more specifically described, and illustrated in the accompanying drawings, wherein are shown embodiments of the invention, but it is to be understood that changes, variations and modifications may be resorted to which fall within the scope of the invention, as claimed.

In the drawings:

Figure 1 is a vertical section of a valve constructed according to an embodiment of this invention.

Figure 2 is a sectional view taken on the line 2—2 of Figure 1.

Figure 3 is a sectional view taken on the line 3—3 of Figure 2.

Referring to the drawings the numeral 10 designates generally a valve housing which includes an intake port 11, and a threaded boss 12, with which the intake pipe 13 is adapted to be connected. The pipe 13 is connected to a source of fluid supply which is adapted to be discharged into the housing 10. The housing 10 includes a substantially cylindrical side wall 14, and opposite end walls 15 and 16 which are normally closed by threaded plugs 17 and 18 respectively. The interior of the housing 10 is divided into a central intake chamber 19 which is defined by a pair of end walls 20 and 21 and which extend across the cylindrical side wall 14.

The housing 10 also has positioned therein a second pair of walls 22 and 23 which define fluid chambers 24 and 25 respectively.

The walls 20 and 22 have mounted therein a cylindrical member 26 which is formed with a plurality of openings 27 for communication of the interior of the cylindrical member 26 with the chamber 24. The walls 21 and 23 also have mounted therein a cylindrical member 28 formed with a plurality of openings 29 communicating the interior of the cylindrical member 28 with the chamber 25.

The housing 10 has secured to one side thereof an offset housing 30 which is formed with a threaded boss 31 with which a pipe 32 is adapted to be connected. The ends of the offset housing 30 communicate with the end or return chamber 33 disposed between the walls 15 and 22.

A chamber 34 is disposed between the walls 16 and 23 communicating with the interior of the offset housing 30 and also commuicating with the interior of the cylindrical member 28. An internally threaded nipple 35 is carried by the housing 10, and communicates with the chamber 24 and a second internally threaded nipple 36 is also carried by the housing 10 and communicates with the chamber 25.

The nipples 35 and 36 are adapted to have connected therewith pipes 37 and 38. A valve plug 39 is slidable in the cylindrical member 26, and a second valve plug 40 is slidable in the cylindrical member 28. The two valve plugs are of like construction and, as shown in Figure 2, each comprises a cup-shaped flexible member 41, which is secured between a pair of washers 42 and 43 mounted on a threaded stem 44. The washer 42 is held in position by means of a nut 45 and a nut 46 bears against the inner side of the washer 43.

The two valve plugs are adapted to be connected together for unitary operation by means of a yoke, generally designated as 46, and which comprises a straight bar 47 which is spaced from a toothed rack 48.

The opposite ends of the bar 47 and the rack 48 are connected to the valve stems by outwardly divergent arms 49 and 50 respectively. The valve plugs are adapted to be moved endwise by means of a shaft 51 which is rotatable in a bushing 52 threaded as at 53 in the housing 10. The bushing 52 includes a reduced stud 54 extending interiorly of the housing 10, and through which the shaft 51 rotatably engages. The shaft 51 has mounted on the inner end thereof, a gear or pinion 55 which meshes with the rack 48 and is locked on the shaft 51 by means of a fastening member 56 engaging through the hub 57 of the gear 55.

A gland 58 is mounted on the upper end of the bushing 52 and includes a seal member 59 which is tightly held about shaft 10 by means of a threaded cap 60.

A hand wheel 61 is mounted on the upper extended end of the shaft 51 so that the shaft may be turned as may be desired.

In the use and operation of this valve the intake pipe 13 is connected to a source of fluid pressure and the pipes 37 and 38 may be connected to the desired element which embodies a return of the fluid which is returned through the valve housing to the return pipe 32. As an example the shaft 51 may be turned so as to move the valve plug 39 to the right and with movement of this plug valve plug 40 will also move to the right.

The two valve plugs are moved so as to uncover the openings 27 and 29 and as valve plug 39 is moved to the right the openings 27 will be in communication with the intake chamber 19 through the interior of the cylindrical member 26. The fluid under pressure will, therefore, flow from chamber 19 through cylindrical member 26, the openings 27 and chamber 24 to the outlet pipe 37.

Valve plug 40, being moved to the right and uncovering openings 29, will permit the fluid, under pressure, to return through return pipe 38 passing through opening 29 into the interior of cylindrical member 28, and then into chamber 34 and return fluid housing 30 from which the fluid will enter the return pipe 32.

At the time the two valve plugs are in their port uncovering positions the return fluid pressure will be equal at the opposite ends of the valve plugs so as to substantially balance these plugs and, therefore, prevent any creeping of the valve plugs under pressure of the fluid in the valve housing.

When it is desired to reverse the position of the valve plugs the shaft 51 is rotated so as to move the valve plugs as a unit to the left until the ports in the cylindrical members 26 and 28 are uncovered. In their extreme left position the pipe 37 is the return pipe and the pipe 38 is the outlet pipe.

This valve structure is of simple construction so that it will not readily get out of order and will provide a simple multi-port valve within the outlet and inlet ports may easily and quickly be reversed where such action is desired.

I claim:

A valve structure comprising a housing, means dividing said housing into a central intake chamber and an outer pair of chambers, a pair of ported cylindrical plug guides carried by said dividing means, an offset return flow housing carried by said first housing and communicating with said guides at the outer ends of the latter, a valve plug slidable in each guide, a yoke extending across said inlet chamber, threaded stems on the ends of said yoke, means adjustably securing said plugs on said stems, a toothed rack carried by said yoke, a pinion engaging said rack, a rotatable stem fixed to said pinion and extending from said first housing, said first named housing having an inlet port communicating with said intake chamber, and also having ports communicating with said pair of outer chambers, movement of said plugs in one direction providing for flow of fluid from said intake chamber through the ports of one guide into one outer chamber and from the latter through the port associated therewith, and for return flow into the other outer chamber, through the ports of the other guide and into said return flow housing.

JOHN L. COONEY.

REFERENCES CITED

The following references are of record in the file of this patent:

UNITED STATES PATENTS

| Number | Name | Date |
|---|---|---|
| 395,625 | Moore | Jan. 1, 1889 |
| 637,010 | Mumford | Nov. 14, 1899 |

FOREIGN PATENTS

| Number | Country | Date |
|---|---|---|
| 17,049 | Great Britain | Sept. 24, 1892 |